(12) United States Patent
Weedon

(10) Patent No.: US 6,732,239 B2
(45) Date of Patent: May 4, 2004

(54) CONCURRENT ACCESS SCHEME FOR EXCLUSIVE MODE CACHE

(75) Inventor: Jonathan K. Weedon, Nevada City, CA (US)

(73) Assignee: Borland Software Corporation, Scotts Valley, CA (US)

( * ) Notice: Subject to any disclaimer, the term of this patent is extended or adjusted under 35 U.S.C. 154(b) by 314 days.

(21) Appl. No.: 10/013,302

(22) Filed: Dec. 7, 2001

(65) Prior Publication Data

US 2002/0091899 A1 Jul. 11, 2002

Related U.S. Application Data

(60) Provisional application No. 60/255,657, filed on Dec. 14, 2000.

(51) Int. Cl.[7] .......................... G06F 13/00; G06F 12/00
(52) U.S. Cl. ................... 711/150; 711/141; 711/145; 711/168; 711/130; 707/201
(58) Field of Search ................................ 711/118, 130, 711/141, 145, 150, 168; 707/201

(56) References Cited

U.S. PATENT DOCUMENTS 5,261,069 A * 11/1993 Wilkinson et al. .......... 711/145

6,557,082 B1 * 4/2003 Josten et al. ................ 711/141

OTHER PUBLICATIONS

Franklin et al, "Transactional Client–Server Cache Consistency: Alternatives and Performance," ACM Transactions on Databas Systems, vol. 22, No. 3, Sept. 1997, pp. 315–363.*
Specification, *Intelligent, Optimistic Concurrency Database Access Scheme*, 23 pgs., application Ser. No. 09/737,122, filed Dec. 14, 2000.
Drawings, 4 sheets, Figs. 1–4 for application Ser. No. 09/737,122, filed Dec. 14, 2000 entitled *Intelligent, Optimistic Concurrency Database Access Scheme*.

* cited by examiner

*Primary Examiner*—Glenn Gossage
(74) *Attorney, Agent, or Firm*—Darby & Darby

(57) ABSTRACT

Methods for permitting concurrent access to an object in a data store of the type having an exclusive access cache are disclosed. The method uses first-in-last-out conditions to control which concurrent transaction, if there is more than one transaction pending for a given object, can provide updated data to the exclusive access cache. Only the first transaction can ever obtain data from the exclusive access cache, but the existence of current transactions when that first one completes precludes the first from updating the exclusive access cache. Rather, the last transaction to commit can update the cache, or leave it empty as the case may be.

4 Claims, 2 Drawing Sheets

CONCURRENT ACCESS SCHEME FOR EXCLUSIVE MODE CACHE

This patent application claims the benefit of priority under 35 U.S.C. § 119 of U.S. Provisional Application Serial No. 60/255,657, filed Dec. 14, 2000, entitled "Concurrent Access Scheme For Exclusive Mode Cache," the entirety of which is being hereby incorporated by reference.

FIELD OF THE INVENTION

The present invention relates to database accessing schemes and more particularly to methods for providing a concurrent access to a cache having exclusive access to a database.

BACKGROUND OF THE INVENTION

In highly concurrent systems it is often desirable to cache parts of the database in a middle tier. This capability is often provided by an object/relational (O/R) engine, which as well as caching, also provides an object model on top of the relational data model. As with any caching architecture, the goal is to off-load a central resource, and provide data access in the middle tier without overly burdening the database.

One of the ways to relieve the burden on the database is to specify that the cache has exclusive access to the database for a certain period of time. This exclusivity constraint means that the only way to modify the underlying database entity is via the cache. Given this constraint, it is then possible to know the value of the entity in the database by looking at the value in the cache. That is, the value can be obtained from the cache without reading from the database.

Although it is commonplace to have such an exclusive caching architecture, it often comes with a serializability constraint. That is, it is assumed that there exists only a single copy of the cached object. This single-copy limitation reduces the effective throughput of the system because it means that only one transaction can use the copy at a time. That is, transactions must be serialized to be able to use exclusive access caches.

The standard practice is to allow only a single exclusive mode copy of a given object to exist. That is, the first transaction to access the object "owns" the object, and other transactions must wait for this first transaction to release the object. If higher concurrency is needed, typically the exclusivity constraint is dropped. That means that any number of transactions can access the entity, but they will all have to read the state of the object from the database. In other words, the caching aspect is disabled.

What is needed in the art is a methodology which permits the exclusivity constraint to be upheld while still allowing for concurrent access to entities. The present invention satisfies this and other needs.

SUMMARY OF THE INVENTION

The invention can be characterized as providing in a data store having an exclusive access cache, a method for permitting concurrent access to an object in the data store, comprising the steps of:

a. responding to a first transaction by retrieving a cache version of the object from the exclusive access cache;

b. responding to any concurrent transactions by retrieving respective new instances of the object from the data store;

c. completing any current transactions by selectively committing any updates that were made to the object with a write operation to the data store; and d. completing a last transaction by selectively committing any updates that were made to the object with a write to the data store and a deposit to the exclusive access cache, the last transaction being either the first transaction or one of the concurrent transactions, if any.

The invention can be further characterized as a method as above, including the additional steps of:

tracking the number of new instances of the object that have been retrieved; and decrementing the number of new instances of the object as each concurrent transaction is completed.

If the number of new instances is tracked, the invention can be further characterized as having step (d) performed when the number of new instances is zero.

These and other steps, features, aspects, and advantages of the invention will be apparent from the accompanying Drawings and Drawing Descriptions and the Detailed Description of Certain Preferred Embodiments.

BRIEF DESCRIPTION OF THE DRAWINGS FIGURES

DETAILED DESCRIPTION OF A PREFERRED EMBODIMENT

By way of overview and introduction, the present invention provides a methodology for interacting with a data store. The inventive method improves upon serialized access schemes that provide a performance benefit to only a single transaction through the use of an exclusive mode cache. As in prior approaches, a first transaction request for a particular object from the data store gets the contents of the cache. However, the inventive method permits multiple instances of the object to be invoked through concurrent access requests to the data store or entity. An index or counter preferably tracks the number of concurrent transactions that have begun, if any, and can be used to control which of the plural transactions updates the cache. When there is only one transaction outstanding, any updates to the object are copied to the data store and are also put into the cache so that a next access of that object can obtain the object directly from the cache, free of the more time consuming read operation to the data store.

The inventive scheme permits exclusive mode caching for a great number of transactions, and thereby greatly minimizes reads to the data store and increases computational speed. For the rarer case of concurrency, the inventive scheme supports processing of multiple concurrent transactions, and such concurrent transactions can be completed before or after the first transaction has completed. What is important to the invention is that the first transaction gets the object from the exclusive mode cache whereas concurrent transactions (that is, requests for the same object before the first transaction has been completed) must obtain the object from the data store, and, equally important, the last transaction to be completed is the one that updates the cache. Preferably, a counter is used to track the transactions as they arise, so that the first one in gets the cache (if the cache is not empty) and the last one updates the cache (if the transaction is committed). If the last transaction does not commit, the cache remains empty and the next time a request is made for that object, the data store must be accessed.

The invention permits users to enjoy both a performance benefit from the exclusive mode caching as well as a concurrency benefit of having multiple copies of the object accessible at one time. The invention is now described in the context of a database, a preferred implementation thereof, though the invention has utility in other applications in which objects might be accesssed by more than one user at a time. A database is typically made of a great number of data records, each including a number of data items having a value either by default or by assignment in response to a user action.

Figure 1:
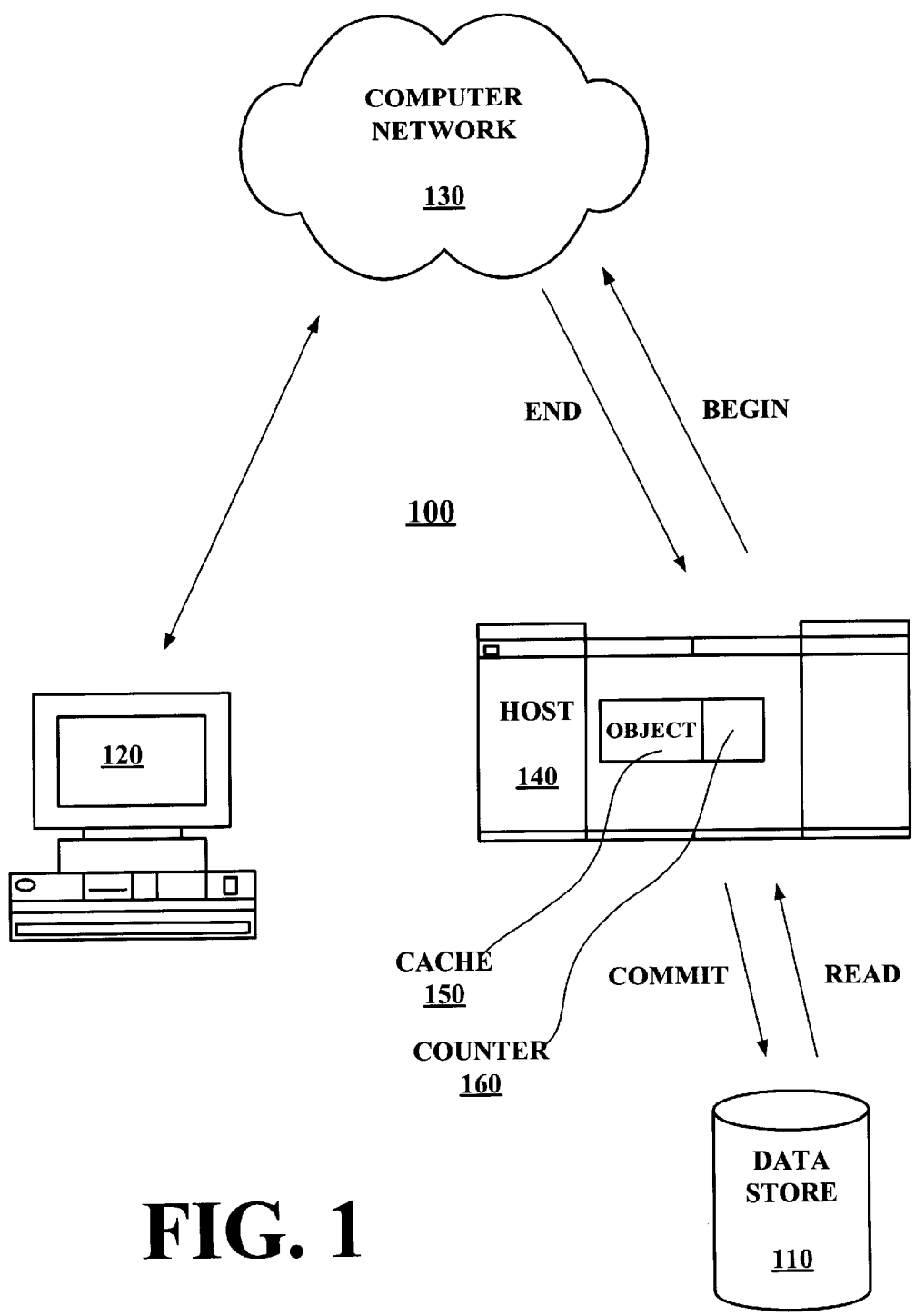
FIG. 1 illustrates a network arrangement 100 that can be used to implement the method of the present invention showing a host having an exclusive access cache.

FIG. 1 illustrates a network arrangement 100 in which a data store (e.g., a database) 110 holds a plurality of objects (e.g., data records). If the data store were a database, then the objects would be data records. The network arrangement 100 forms no part of the present invention, but rather is illustrated to show one possible environment in which the access scheme of the present invention can be used.

A plurality of users at respective client machines 120 access the data store 110 through two-way communications with a computer network 130 in any conventional manner. The computer network 130 can be a distributed computer network such as the Internet, a wide area network, a local area network, and the like. Concurrent requests for the same object from multiple users can be processed by a host 140, or by middle-tier software resident at the host 140 or elsewhere. However, the host 140 includes a cache 150 which is configured in an exclusive access mode such that only one user can get its contents and only one user can place new data in the cache. As will be described in detail below, the host 140 permits a different user to check an object out of the cache 150 than the user who checks the object back into the cache, although in a great number of transactions, the user who checks the object out of the cache is the same user who checks the object back in. A counter 160 is provided in the presently preferred embodiment for tracking which user is authorized to interact with the cache 150.

Each user at a client machine begins a transaction which includes a local cache copy of the object which can be read and modified at the user's discretion. The local cache copy is not to be confused with the cache 150. The cache 150 permits access to an object in the data store without resorting to a read operation from the data store and, consequently, provides a performance advantage to users able to access the cache 150 instead of the data store. The local cache copy holds modifications entered by a user until the transaction is complete and such modifications, if any, are provided to the data store for updating the object.

A "user" should be understood to be a person at a client machine 120, or an automated process (e.g., software routine) configured to access the data store 110 for any one of a number of reasons. The term "modify," "modification" and other forms of that word refer to the changes proposed by a user or process which, because of potential conflict with other concurrent users of that object, have not been committed to the data store. The term "update" or "record" or "store" in their various forms refers to a change in the object (including changes to the values of one or more data items contained in the data record in the event that the object is a data record). Thus, once a transaction commits, the modifications in the cache copy are updated to the object in the data store 110.

If a transaction commits, then each of the modifications to the object is updated to the data store. The first concurrent transaction will always commit because it is necessarily conflict free. On the other hand, if a transaction is disallowed ("rolled back") due to conflict, none of the modifications are stored in the data store. For a description of a conflict minimizing scheme which can be used with the present invention, see U.S. patent application Ser. No. 09/737,122, filed on Dec. 14, 2000, even date herewith, entitled "Intelligent, Optimistic Concurrency Database Access Scheme," the entirety of which is hereby incorporated by reference.

Generally speaking, a transaction includes access to a data object which represents a state which may originate from any of a number of sources. The requested object may be retrieved from the cache 150, if the transaction is the only request for that object and if the cache for that object is not empty, and otherwise from the data store 110. A transaction ends with an update to the cache (if it is the only transaction and if the update is also to be committed to the data store), but only if it is the last transaction. If there are concurrent transactions pending, then the transaction ends simply by committing its updates to the data store.

Figure 2:
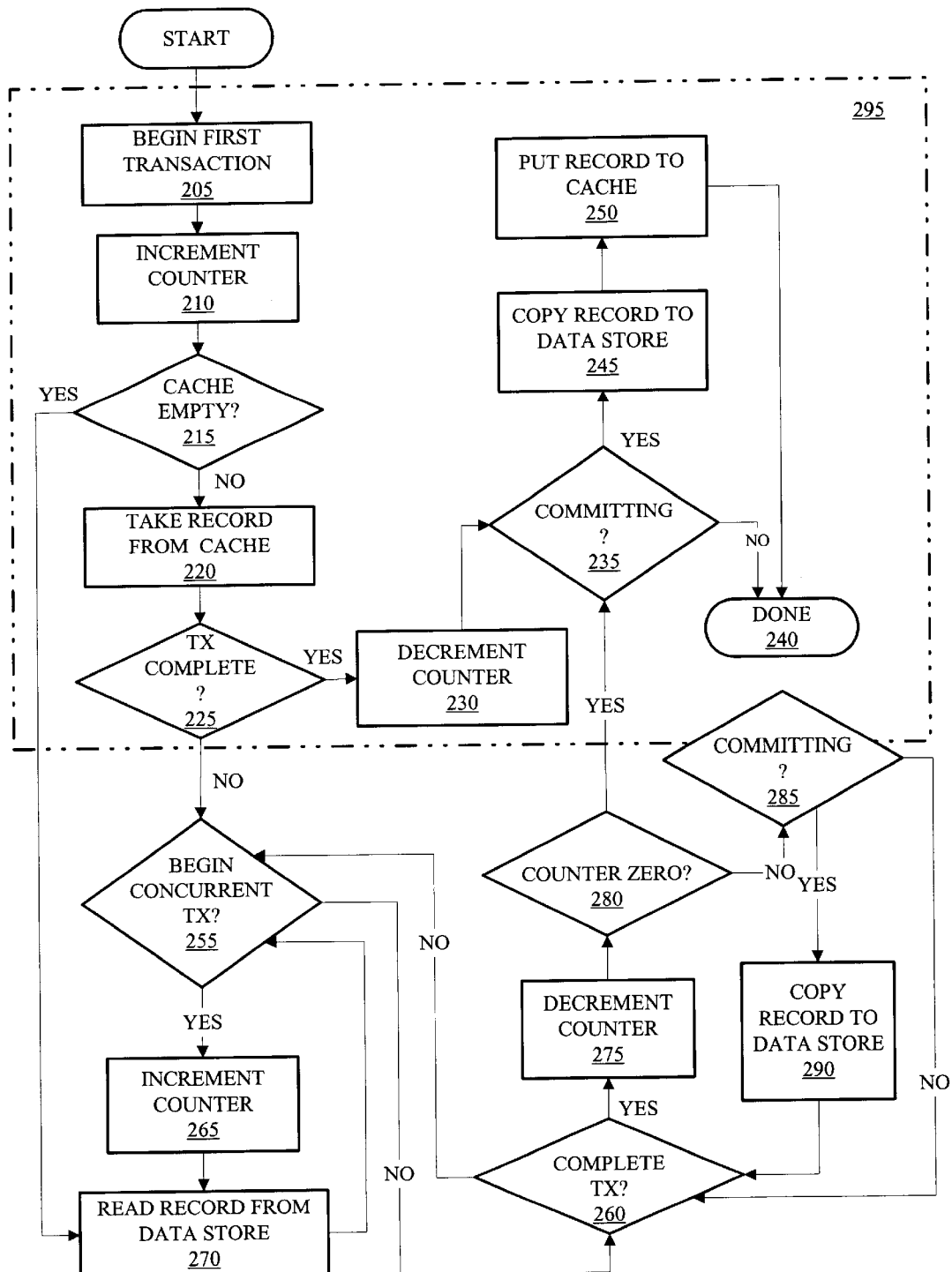
FIG. 2 is a flow diagram of a method which permits use of an exclusive access cache for a data store as shown in FIG. 1, in a concurrent access regime.

With reference now to FIG. 2, a method in accordance with a preferred embodiment is described. A first transaction begins at step 205 by accessing a data object representing an entity in a database. A counter 160 within the host machine 140 is incremented as indicated at step 210. The counter is indicative of the number of copies of a particular object that exist at any given point in time. A test is made at step 215 to determine whether the exclusive mode cache maintained by the host 140 is empty. In a conventional exclusive mode cache, a copy of the object is present within the cache and is available for the exclusive use of the first transaction. Any other request for that object is serialized, as described above. However, in accordance with an aspect of the present invention, concurrent transactions can still be processed.

If it is determined that the cache is not empty, then at step 220 the object is taken from the cache. If the transaction is then completed, as tested at step 225, it can be tested to see whether it should be committed, or rolled back. In this scenario, there is no concurrent transaction, and no need for the counter; however, to accommodate concurrent transactions and avoid the need to serialize user requests, the counter is included in order to manage two special conditions. The use of a counter is not required, but is a convenient construct both for implementing the invention and for describing the preferred embodiment.

A first transaction presents a special condition because that transaction can be provided with the object directly from the exclusive mode cache 150 (step 220). Another special condition is when the last concurrent transaction (or the only open transaction) is committed in which case the exclusive mode cache must be updated. These end conditions are sometimes referred to as "first-in-last-out" conditions.

If the transaction is complete, as was tested at step 225, then the counter which enables testing of these special cases, is decremented at step 230. A decision is made at step 235 as to whether the transaction is to be committed or not. If the transaction is not to be committed, then neither the data store nor the exclusive mode cache is updated. Instead, the process simply ends as indicated at step 240. On the other hand, if the modifications to the data record are to be committed to the data store, then at step 245 the present data record that includes all the modifications from the transaction are copied to the data store and at step 250 those modifications are also put into the exclusive mode cache. The data access process then ends at step 240.

The foregoing steps are encircled by a box 295 drawn in phantom lines to illustrate a portion of the access scheme which, apart from the use of a counter, has been generally recognized in the art. The use of the counter enables the end condition which permits a transaction to update the cache, and so the steps outlined in the box 295 differ in an important respect over prior art approaches. Moreover, the present invention departs from the prior art in permitting concurrent transaction processing in further steps which coordinate with steps 205–250, as described next.

In the event that the transaction was not complete, as tested at step 225, then an additional test is made at step 255, to determine whether there are any concurrent transactions to be processed. Step 255 determines whether a concurrent transaction is to begin. Just as with the first transaction, the concurrent transaction can arise in response to user action or a system process. If no concurrent transaction has arisen, then the process flow goes to decision block 260 where a test is made to determine whether any transaction is complete. The decision block 260 is no different in character then the decision block 225, but is separately illustrated in FIG. 2 for purposes of discussion only; one of skill in the art will understand that the process flow of FIG. 2 can be implemented in a variety of ways which are not bound by the particular details or arrangement of steps illustrated in FIG. 2 which is by way of illustration, and not limitation.

The method loops between decision blocks 255 and 260 to detect the beginning of a concurrent transaction or the end of an already-begun transaction. In the event that a concurrent transaction arises, then the counter is incremented at step 265 to reflect the fact that another copy of the data record is being made, and a copy of the record is read from the data store 270, as illustrated by the arrow denoted "read" in FIG. 1. Once the record has been read, the process flow loops back to the tests at steps 255 and 260 for additional concurrent transactions or completions of transactions. As each concurrent transaction begins, the counter is further incremented at step 265 wherein additional copies of the record are read from the data store at step 270. When the test at 260 indicates that the transaction is complete, the counter is decremented, as indicated at step 275, and then tested to see whether is has reached zero, as shown at step 280. A "zero" counter value presents one of the special end conditions referred to above, although any arbitrary data value can be used for testing an end condition.

If the counter is not zero, that indicates that concurrent transactions are being processed. Updates of the just-completed transaction (from step 260), if any, may have to be copied to the data store. A test is made at step 285 to determine whether there is any non-conflicting update to commit, and if there is, the data store is updated at step 290. In this circumstance, multiple copies of the data are out for processing, with the first transaction having exclusive access to the exclusive mode cache, and subsequent concurrent transactions having access to copies of the data from the data store. In sharp contrast to the prior art, these transactions can be updated to the data store while the exclusive mode cache is locked up for the first transaction.

On the other hand, if the test at step 280 determines that the counter is zero, then the just completed transaction is the last outstanding transaction. In that case, a test is made at step 235 to determine whether the transaction is to be committed to the database. As described above, if the transaction is to be rolled back, then the process flow ends at step 240. Otherwise, the updates are committed to the data store by copying the record in that transaction to the data store, as shown at step 245, and by putting the contents of that object in the exclusive mode cache 150, as indicated at step 250.

As a consequence of the process flow of FIG. 2, each time that a last outstanding transaction is committed to the data store, the exclusive mode cache will be updated to include the new data values. This enables the next transaction to begin by accessing the exclusive mode cache 150 in lieu of the data store 110. This translates into a performance advantage insofar as the overhead associated with accessing the data store is avoided. Moreover, if a concurrent transaction has begun prior to the first transaction completing, it too can be accommodated, albeit without the performance advantage of the use of the exclusive mode cache 150. Since the exclusive mode cache is in use by the first transaction, the concurrent transactions each receive respective copies of the record from the data store, and the counter is used to index the number of shared copies that are outstanding and being operated upon at any given moment. The counter at zero test permits discrimination between the circumstance in which a concurrent copy of the transaction is being completed as compared to when the last outstanding transaction is being completed. In the event that a concurrent copy of the record is being completed, then the exclusive mode cache is left untouched, and any committing to the data store will be made by copying the modified object directly to the data store 110.

The methodology used herein can be considered a degenerative routine which starts out providing fast access for the first transaction but is then slower for any concurrent transaction that needs to be processed. Preferably, when a counter is used, the counter is updated/incremented automatically with the transaction obtaining the exclusive mode cache copy of the object. Any concurrent transactions receive their copies of the object from the data store. This is the degeneration of the routine: the first transaction gets the copy from the cache 150, and does not need to access the data store 110, whereas the second transaction must access the data store to obtain a copy to review and/or modify. Like the first transaction, the second transaction preferably increments the counter simultaneously, if a counter is used. This process continues for all other concurrent transactions, with the counter being incremented as required.

Each transaction is subsequently completed, meaning that it is either committed or rolled back. If the transaction is committed, it means that the copy of the record is written back to the database (if it was modified). If the transaction was rolled back, it means that the copy of the record is thrown away.

As part of the completion process, the sharing counter is decremented. If the value after decrementing is zero, that indicates that the transaction currently completing is the only transaction to have a copy of the record at that point in time. If the post-decrement counter value is zero, and if the transaction is committing (meaning that the record is being copied back to the database) then this record is also put back into the exclusive mode cache, to be used by subsequent transactions.

The method of the present invention can be used to improve the throughput of any data caching architecture, by minimizing the update conflicts. Thus, the methodology can be advantageously employed in an object/relational caching software product, or as a routine within the caching layer of an application server product, such as AppServer 4.0, a product of Borland International, Inc., Scotts Valley, Calif., and later releases.

While the present invention has been described with respect to a particularly preferred embodiment, the invention is susceptible to implementation in other ways which are within the spirit of the invention which is defined in terms of the recitations of the appended claims and equivalents thereof.

I claim:

1. In a data store having an exclusive access cache, a method for permitting concurrent access to an object in the data store, comprising the steps of:

(a) responding to a first transaction by retrieving a cache version of the object from the exclusive access cache;

(b) responding to any concurrent transactions by retrieving respective new instances of the object from the data store;

(c) completing any current transactions by selectively committing any updates that were made to the object with a write operation to the data store; and (d) completing the first transaction by selectively committing any updates that were made to the object with a write to the data store and a deposit to the exclusive access cache.

2. The method as in claim 1, including the additional steps of:

tracking the number of new instances of the object that have been retrieved; and decrementing the number of new instances of the object as each concurrent transaction is completed.

3. The method as in claim 2, wherein step (d) is performed when the number of new instances is zero.

4. The method as in claim 1, wherein the data store is a database and the object is a data record.

* * * * *